US008493479B2

(12) United States Patent
Widzinski et al.

(10) Patent No.: US 8,493,479 B2
(45) Date of Patent: *Jul. 23, 2013

(54) METHOD OF ELIMINATING BACKGROUND NOISE (75) Inventors: Thomas J. Widzinski, Rochester, NY (US); Thomas D. Pawlik, Rochester, NY (US); Erwin L. Allmann, Penfield, NY (US); Gary M. Spinelli, Hilton, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/094,973

(22) Filed: Apr. 27, 2011

(65) Prior Publication Data
US 2012/0274819 A1 Nov. 1, 2012

(51) Int. Cl.
*H04N 5/217* (2006.01)

(52) U.S. Cl.
USPC .................. 348/250; 348/222.1; 348/241

(58) Field of Classification Search
USPC ............................................ 348/250
See application file for complete search history.

(56) References Cited

U.S. PATENT DOCUMENTS

| | | | | |
|---|---|---|---|---|
| 5,291,403 A * | 3/1994 | Ito | | 250/587 |
| 5,535,289 A * | 7/1996 | Ito | | 382/130 |
| 5,914,748 A * | 6/1999 | Parulski et al. | | 348/239 |
| 2002/0146169 A1* | 10/2002 | Sukthankar et al. | | 382/170 |
| 2003/0016306 A1* | 1/2003 | Ogata et al. | | 348/671 |
| 2003/0210810 A1* | 11/2003 | Gee et al. | | 382/128 |
| 2004/0184667 A1* | 9/2004 | Raskar et al. | | 382/254 |
| 2004/0208340 A1* | 10/2004 | Kirschner | | 382/103 |
| 2004/0212725 A1* | 10/2004 | Raskar | | 348/370 |
| 2004/0262547 A1* | 12/2004 | Ross et al. | | 250/556 |
| 2005/0018893 A1* | 1/2005 | Wang et al. | | 382/132 |
| 2005/0128323 A1* | 6/2005 | Choi | | 348/239 |
| 2005/0195317 A1* | 9/2005 | Myoga | | 348/370 |
| 2006/0008171 A1* | 1/2006 | Petschnigg et al. | | 382/254 |
| 2006/0083500 A1* | 4/2006 | Kito | | 396/3 |
| 2006/0152603 A1* | 7/2006 | Enge et al. | | 348/234 |
| 2007/0127817 A1* | 6/2007 | Yokoi | | 382/181 |
| 2008/0106636 A1* | 5/2008 | Wernersson | | 348/371 |
| 2008/0107304 A1* | 5/2008 | Coulter et al. | | 382/103 |
| 2008/0181447 A1* | 7/2008 | Adams et al. | | 382/100 |
| 2009/0023991 A1* | 1/2009 | Gono et al. | | 600/109 |
| 2009/0175609 A1* | 7/2009 | Tan | | 396/77 |
| 2010/0040282 A1* | 2/2010 | Bala et al. | | 382/165 |
| 2011/0007955 A1* | 1/2011 | Ho et al. | | 382/128 |
| 2012/0274819 A1* | 11/2012 | Widzinski et al. | | 348/250 |

OTHER PUBLICATIONS

M. Evening; Working with Image Stacks; Adobe Photoshop CS3 for Photographers, pp. 1-7, May 2007.

* cited by examiner

*Primary Examiner* — Roberto Velez
*Assistant Examiner* — Abdelaaziz Tissire
(74) *Attorney, Agent, or Firm* — Nelson Adrian Blish (57) ABSTRACT

A method of eliminating background noise from a system for authenticating security markers includes capturing an image of a background of the security marker; illuminating the security marker; capturing a plurality of images of the optical response of the security marker; averaging the plurality of optical response images; smoothing the background image; and subtracting the smoothed background image from the average of the plurality of optical response images.

7 Claims, 9 Drawing Sheets

| 21 | 22 | 23 | 23 | 27 | 29 | 30 | 30 | 31 | 32 | 32 | 36 | 37 | 37 | 38 | 39 | 40 | 42 | 43 | 44 | 47 | 48 | 48 | 55 | 60 |

60 ⟶ (row label)  62 ⟶ (circled 37)

*FIG. 6*

| 32 | 29 | 30 | 21 | 30 |
|----|----|----|----|----|
| 23 | 36 | 38 | 37 | 31 |
| 55 | 47 | (37) | 23 | 32 |
| 43 | 22 | 48 | 48 | 42 |
| 37 | 39 | 27 | 44 | 40 |

METHOD OF ELIMINATING BACKGROUND NOISE

CROSS REFERENCE TO RELATED APPLICATIONS

Reference is made to commonly-assigned copending U.S. patent application Ser. No. 13/095,006, filed Apr. 27, 2011, entitled SIGNAL IMAGE EXTRACTION, by Widzinski et al.; the disclosure of which is incorporated herein.

FIELD OF THE INVENTION

This invention generally relates to increased accuracy of signal detection through the reduction of image background noise. It is specifically concerned with security markers applied at very low levels to objects which, when excited with light of appropriate wavelengths, emit radiation which produce a unique image, for authenticating and identifying the object. The marker image is enhanced through the subtraction of all non-marker radiation emitted at wavelengths of detection.

BACKGROUND OF THE INVENTION

If goods are not genuine, then product counterfeiting has occurred. If goods have been diverted from their intended channel of commerce, then the goods have been subject to product diversion.

Product counterfeiting occurs on artworks, CDs, DVDs, software recorded on CDs, fragrances, designer clothes, handbags, briefcases, automobile and airplane parts, securities, identification cards (driver's licenses, passports, visas, green cards), credit cards, smart cards, and pharmaceuticals. According to the World Health Organization, more than 7% of the world's pharmaceuticals are counterfeit. This percentage is higher in some countries, such as Colombia, where up to 40% of all medications are believed to be counterfeit. Until recently, the percentage of unauthorized medications in the United States has been virtually negligible due to a tightly controlled regulatory system that has made it extraordinarily difficult for counterfeiters to sell or distribute counterfeit medications. However, the recent explosion of internet drug sales from other countries and increasingly sophisticated counterfeiting techniques have substantially increased the amount of fraudulent drugs entering the United States.

Product diversion has also occurred on many of the aforementioned goods. Such diversion could result in the distribution and sale of goods which do not comply with the product specifications required in the markets where they are sold. For example, motorcycles intended to be sold without catalytic converters in a region with lower air pollution standards might be diverted to a region which does require such catalytic converters. Other negative effects include price inequities in certain markets, loss of exclusivity by some manufacturers or distributors, and damage to the goodwill, patent rights, and trademark rights of the manufacturer. Such diverted goods are sometimes referred to as "gray market" goods. Since the goods are genuine, it is sometimes difficult to determine whether the goods have been improperly diverted. This is especially true for a variety of goods such as, for example clothing, pharmaceuticals, and cosmetics.

The application of security markers to an object or product for authenticating the origin and intended market of the object product are known in the prior art. These security markers can be incorporated into components which make up the object or can be incorporated into papers, inks or varnishes that are applied to the object or into to labels affixed to the object or packaging for the object. The presence of security markers verifies the authentic origin of the object and is verified by means suited to the particular nature of the marker.

Non-destructive detection of security markers via characteristic emission capture on an image sensor during or following marker excitation is also known in the prior art. Detection of particular wavelengths of light emitted by marker particles may be compromised by noise in the image if extraneous light sources include similar wavelengths of light and are conveyed into the field of view by light conducting materials. Many transparent or opaque materials are good conductors of light. Examples include glass, opaque bottles, thin polymer films and laminates, semi transparent papers etc.

Inclusion of extraneous radiation into the reader's field of view can result in illuminated pixels in the preferred marker emission image. This condition weakens the accuracy of illuminated pixel count and could lead to a passing condition when no marker emission is present, or, could lead to a failing condition where preferred marker is present in the preferred manner, but the preferred signal is overwhelmed by extraneous radiation. An accurate background subtraction is required.

Background image capture is accomplished when no excitation illumination accompanies a frame capture. This image is too noisy, that is, too much pixel to pixel intensity variation for a dark plane, to be subtracted from an emission image without worsening the noise position in the resultant image. A method for reducing noise in the background image is needed.

SUMMARY OF THE INVENTION

Briefly, according to one aspect of the present invention, security marker emission image accuracy is improved by application of a median filter to a background image. Improvement is realized through the subtraction of the smoothed background image from a high resolution security marker emission image that produces a high resolution security marker image free of extraneous light interferences. All hardware and logic required to capture background and emission images, process said images and finally compare against predetermined pass criteria are contained within a handheld, stand alone device.

Separation of marker emission signals from stray light noise is accomplished in this invention through the use of image subtraction. First, marker emission images are collected and processed, resulting in a high resolution emission image. This image can only be captured when an appropriate excitation signal is simultaneously directed onto an object containing security marker particles. Next, a background image is collected that includes all sources of extraneous light as well as general sensor and circuitry noise. In an ideal situation, this background image would be completely void of light. In practice, light occasionally finds its way into the background and signal images through the methods and materials previously described. The background image contains signals from extraneous light, but of particular importance to this invention, contains image noise. This noise can be thought of as the presence of "hot and cold" pixels. Subtraction of the noisy background image from our lower noise high resolution security marker image actually increases noise in the final output image.

This invention imparts noise reduction of the background image through application of a median filter. Hot and cold pixels are "smoothed" based on emission intensity values of their spatial neighbors and median intensity replacement of pixel of interest. Once this treatment is completed, coordinated pixel by pixel subtraction of the smoothed background image from the high resolution security marker image will result in a much more precise representation of security marker emission. Overall, security marker emission signal to noise representation is greatly improved through the use of this technique.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 9:
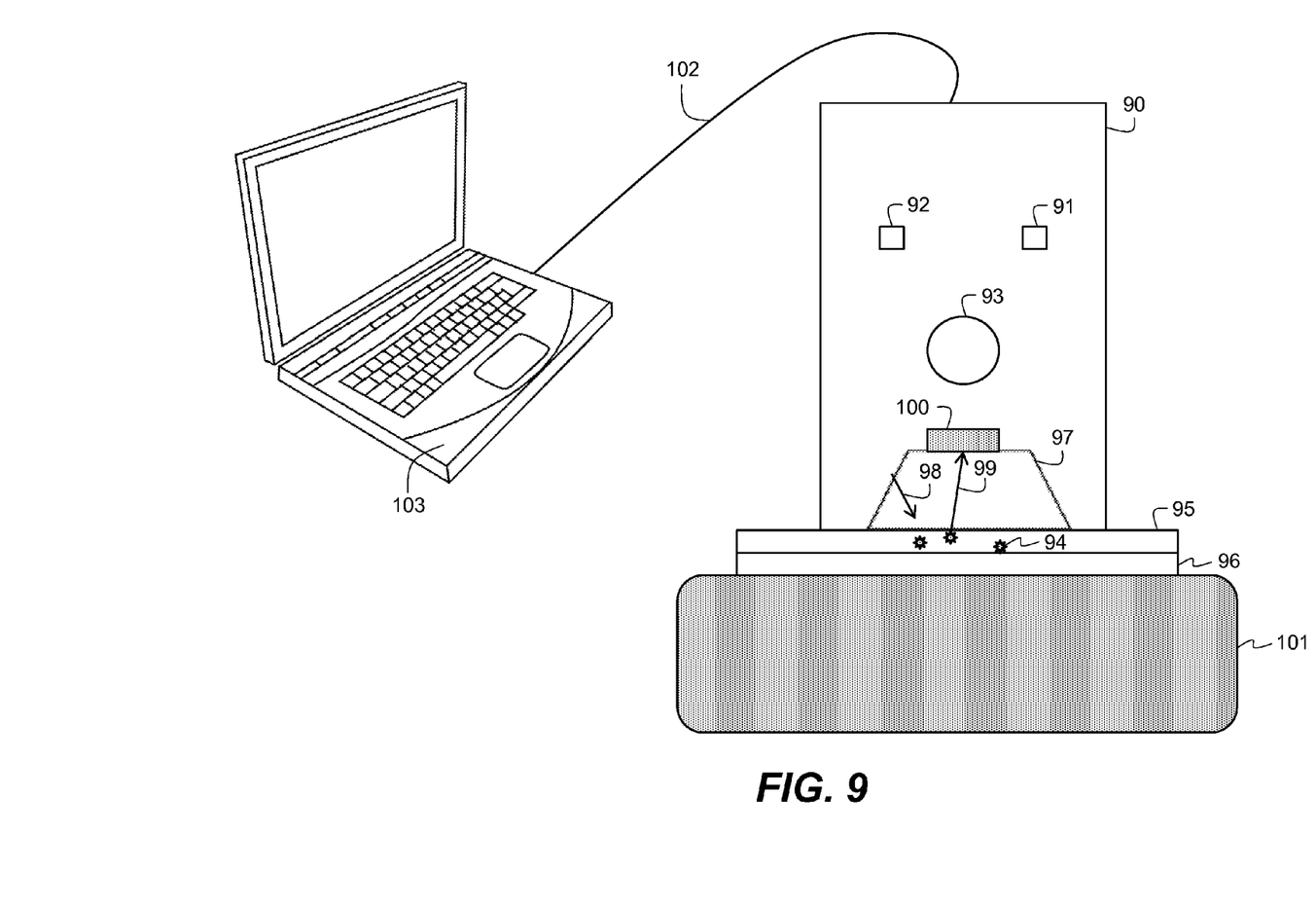
FIG. 9 is a representation of a security marker detection system connected via USB to a personal computer.

Referring now to FIG. 9, independent modes of operation of the reader are described. Within the reader 90, images are not routinely collected and saved, nor are they required to be. However, there is the ability to capture and analyze images in a separate computing device. The representation here only serves to illustrate the mechanics of noise reduction for this embodiment. Logic is incorporated into the reading device so as to operate in a standalone manner.

Analysts wishing to see image representations of the reader data are satisfied with apparatus described in FIG. 9 that includes image acquisition of an object 101, possibly a pharmaceutical bottle, with label 96 that includes a varnish overcoat 95 wherein marker particles 94 are dispersed. The reader device 90 includes an actuator 93, a pass indication signal 92, and a fail indication signal 91. The cut away illumination/detection region is represented by trapezoid 97. Excitation radiation 98 is projected from the reader onto the marker particles 94 and their subsequent emission 99 is detected by the reader image sensor 100. Besides processing the image and related data internally, the reader 90 can communicate with a computer 103 via USB connection 102. With appropriate software an analyst can visualize the images captured and processed by the reader 90, then transferred for display to the computer 103.

Figure 1:
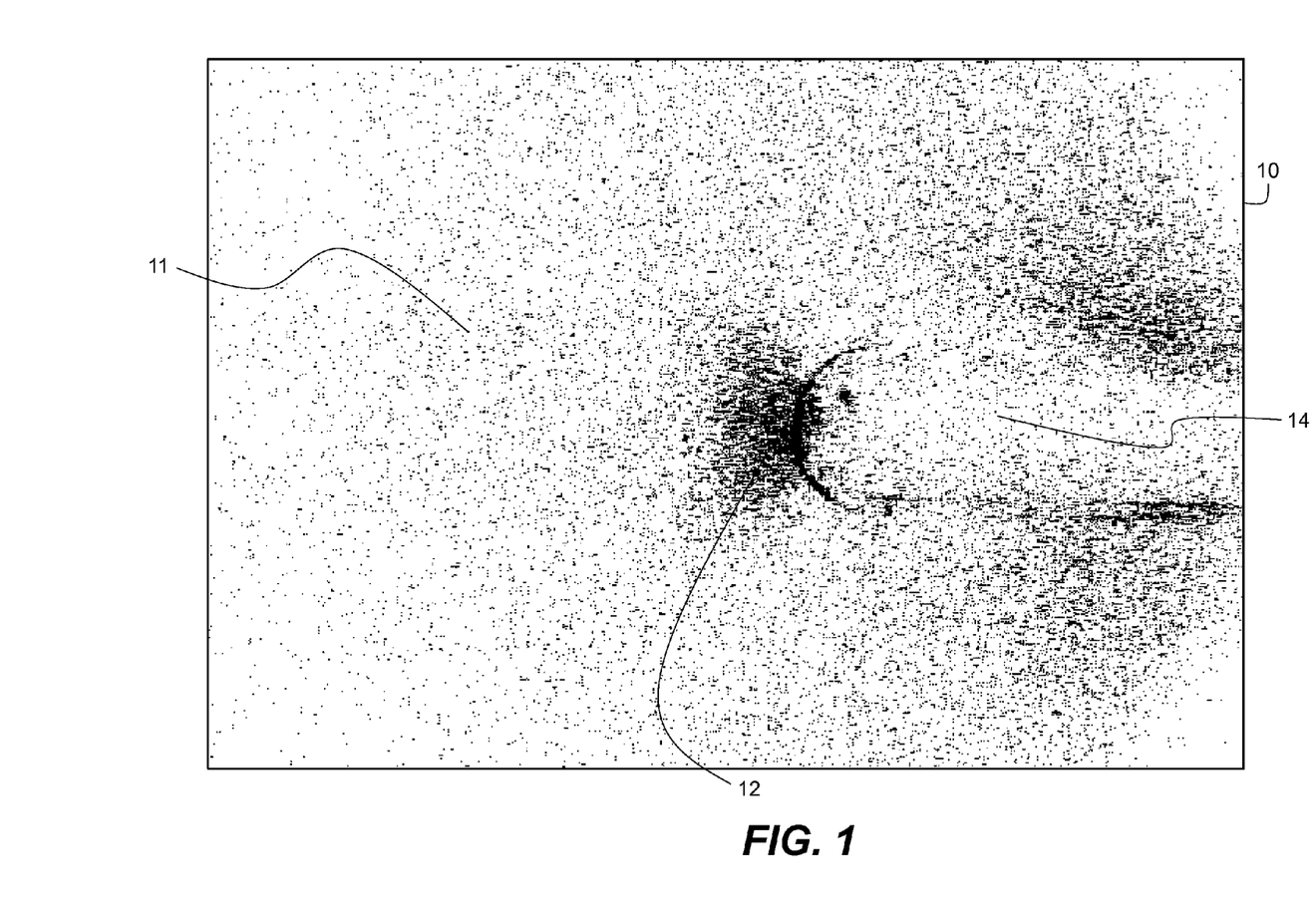
FIG. 1 is a background image with extraneous radiation from a glass rod.

Referring now to FIG. 1 image frame 10 which is a visual representation of the image data gathered during a capture of a target without co-incident application of electromagnetic radiation 98 on the target surface. This image includes a source of extraneous radiation 12 which has been conducted into the image via glass rod 14. Random signal noise 11 is represented by the small dots dispersed throughout the frame.

Figure 2:
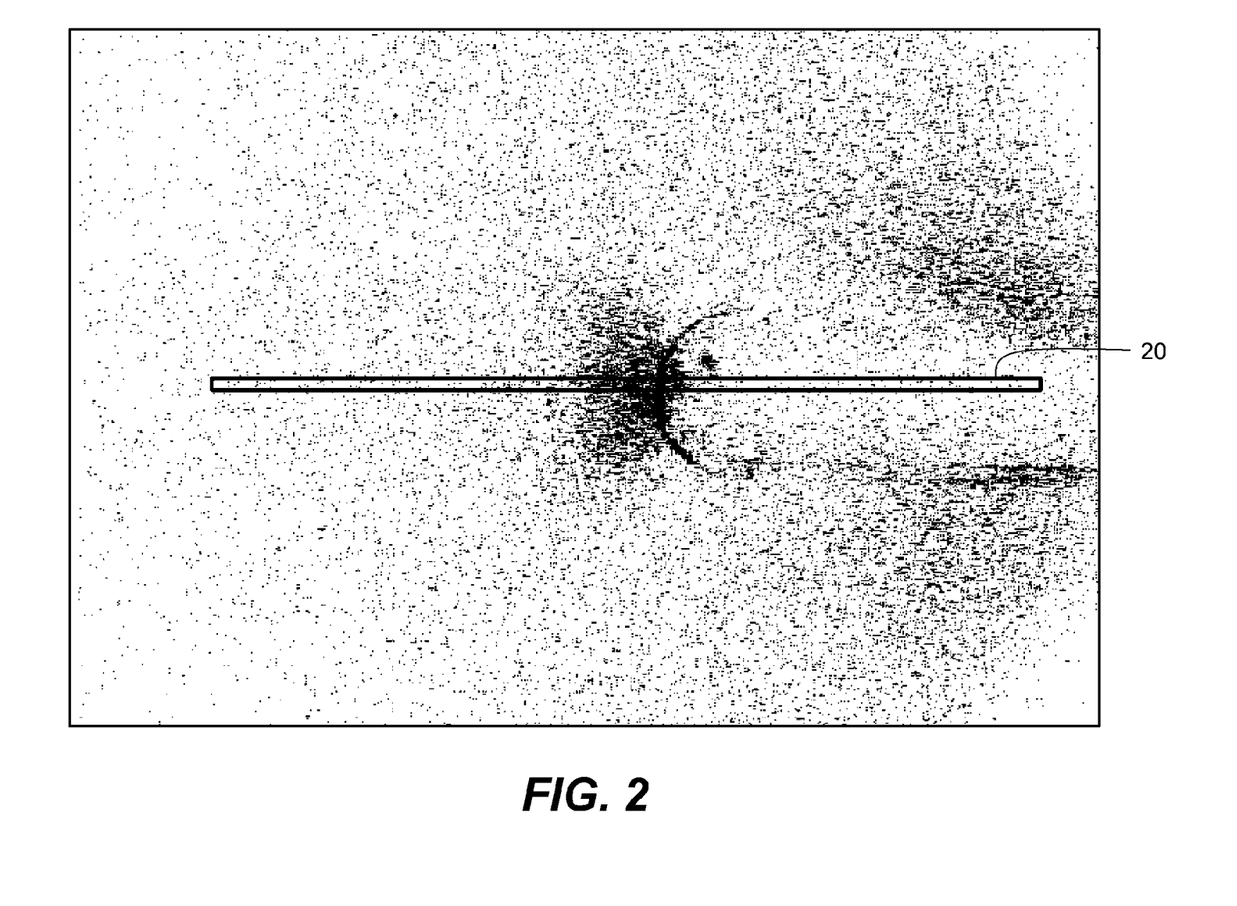
FIG. 2 is a representation of the FIG. 1 image with a single row of pixels selected as indicated by the narrow rectangular outline.
Figure 3:
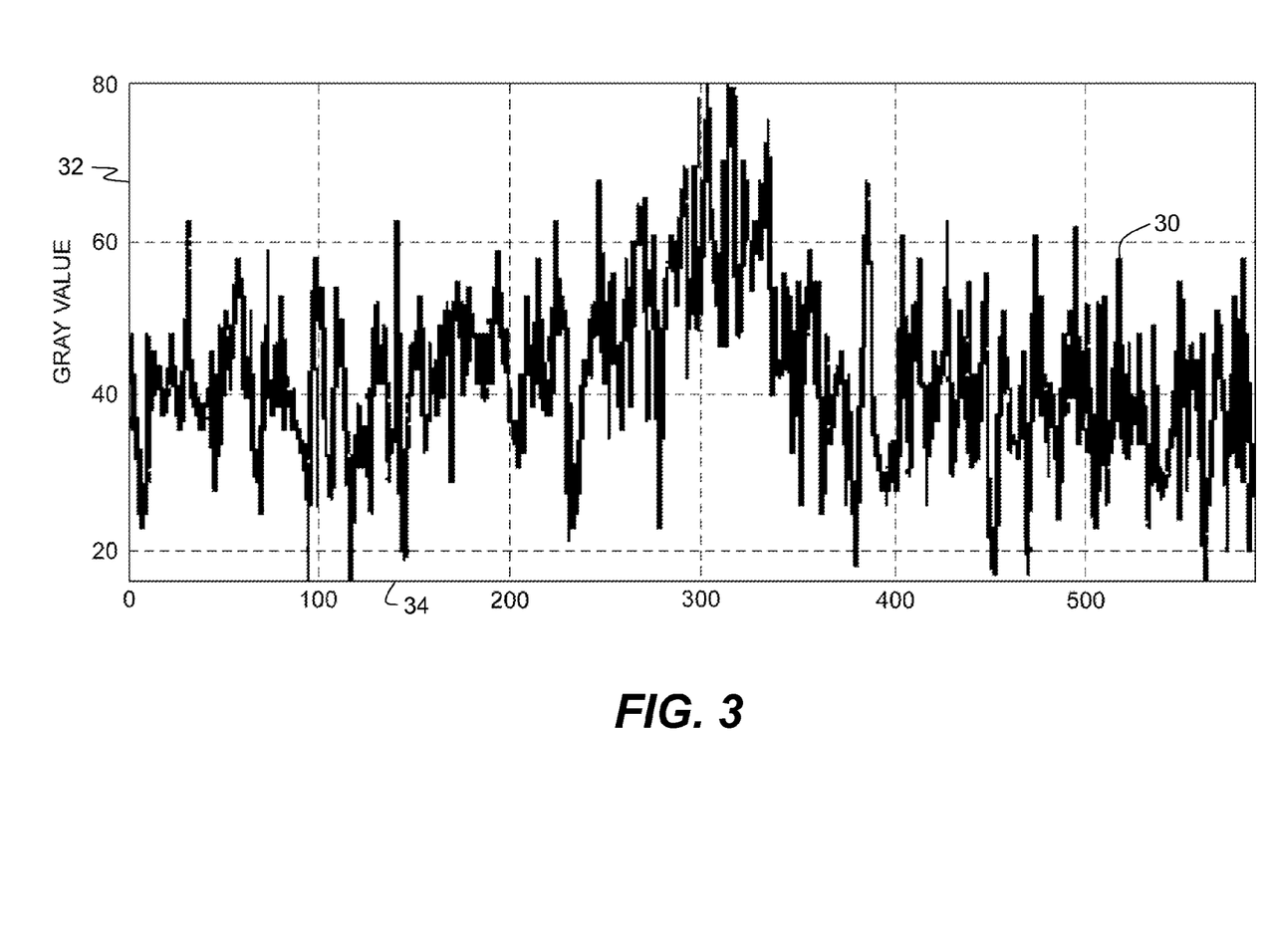
FIG. 3 is a graphical representation of pixels selected in FIG. 2, with intensity displayed by the ordinate and pixel count by the abscissa.

Referring now to FIG. 2, a one pixel row 20 has been selected for the purpose of examining pixel intensity detail. FIG. 3 reveals the point by point intensity value 30 and provides a visual sense of variability. The ordinate 32 represents pixel intensity and is labeled Gray Value. The abscissa 34 indicates pixel sequence number from the selected row in FIG. 2. Additionally, the profile variation caused by conveyance of extraneous radiation 12 is obvious in the data profile.

Figure 4:
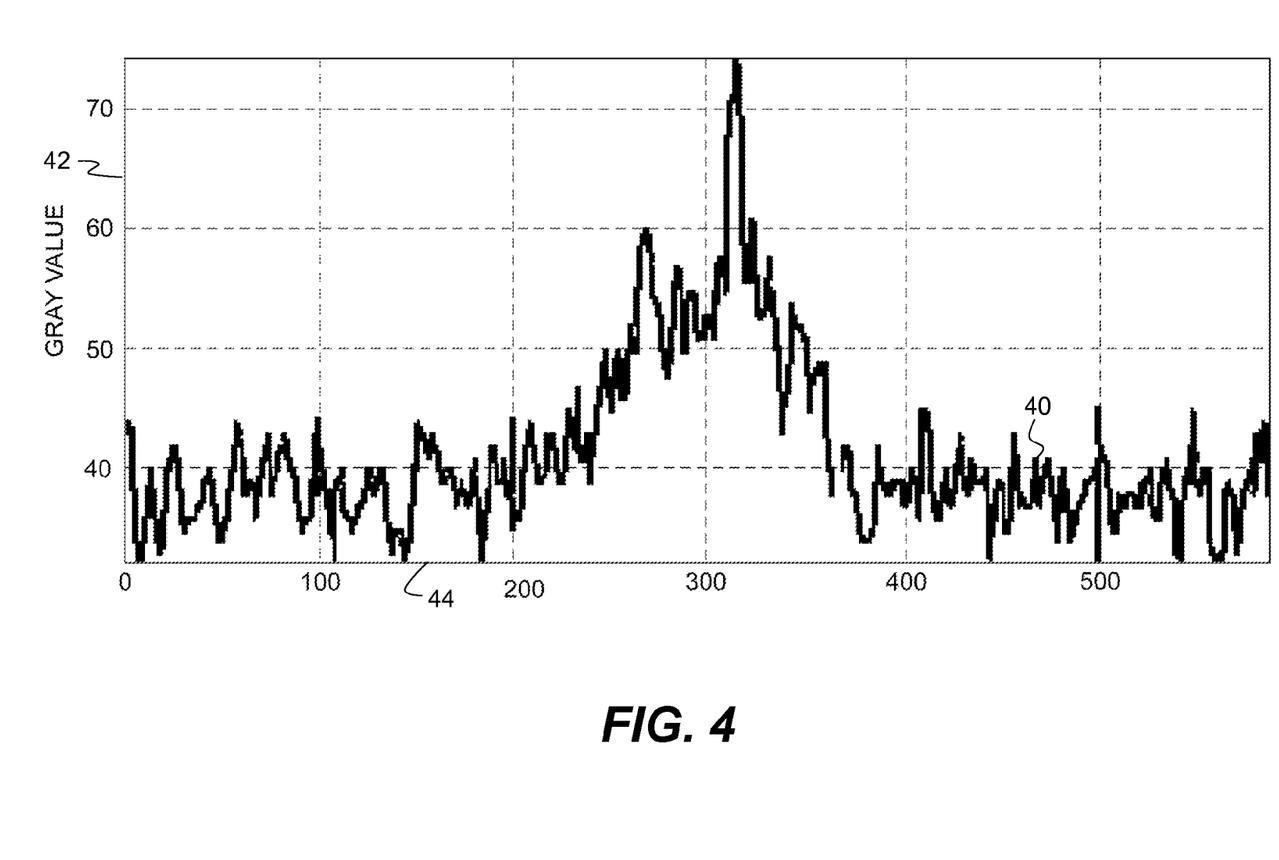
FIG. 4 is a graphical representation of pixels selected in FIG. 2 after the median filter has been applied with intensity displayed by the ordinate and pixel count by the abscissa.
Figure 5:
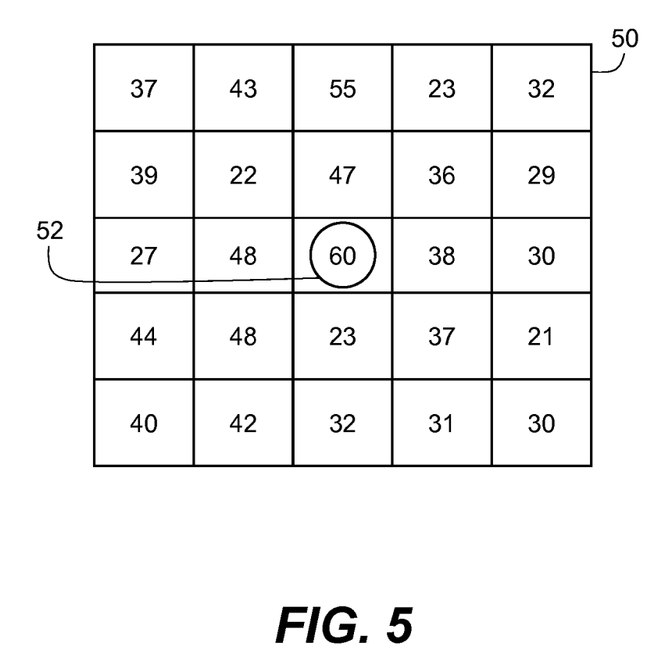
FIG. 5 is a spatial representation of a pixel array of radius 2 and numeric values represent pixel intensity.
Figure 6:
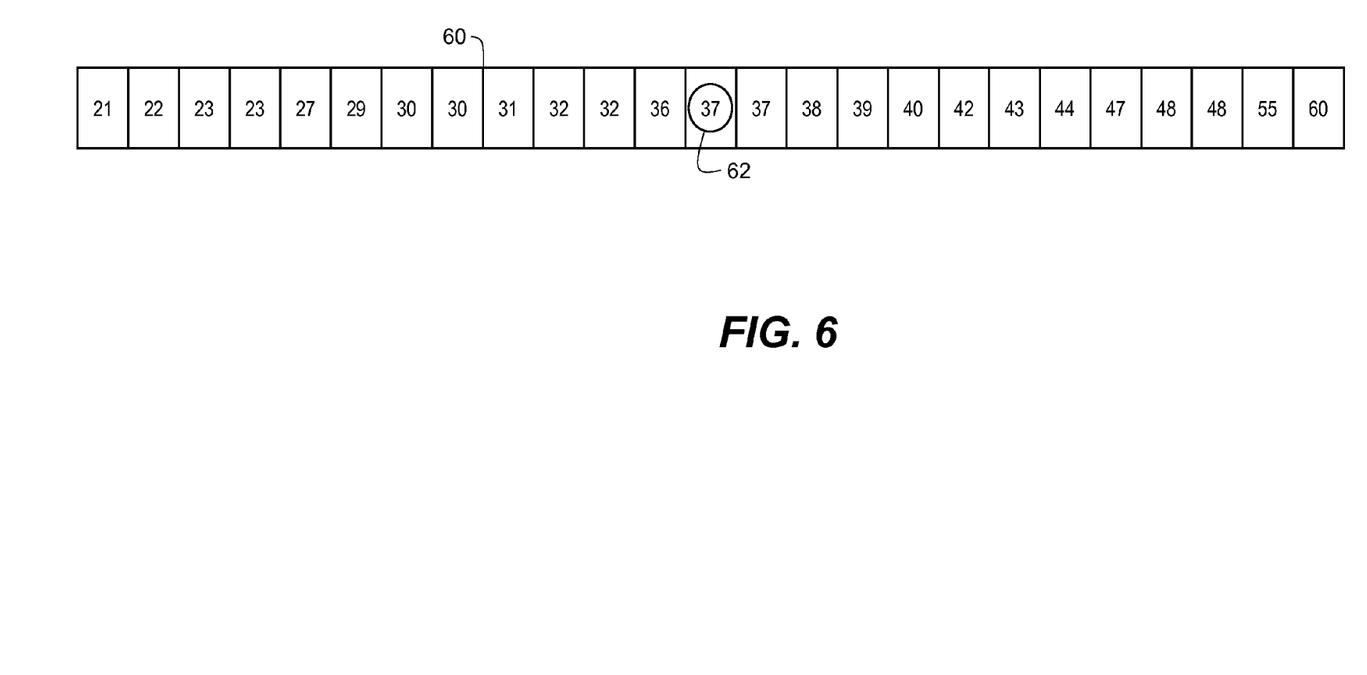
FIG. 6 is a listing of all pixels in the array ordered from low to high with median value highlighted.
Figure 7:
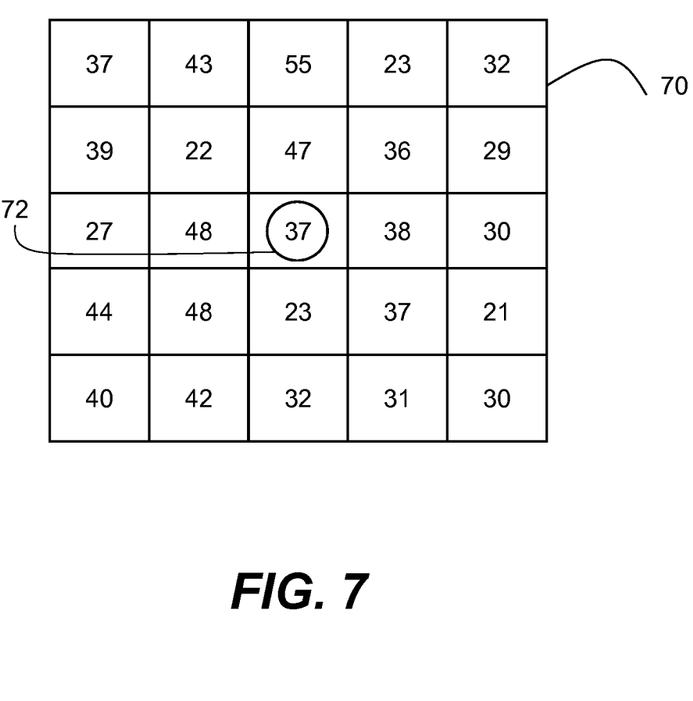
FIG. 7 is a spatial representation of a pixel array as presented in FIGS. 5 and 6.

Referring now to FIG. 5, a spatial representation of a randomly selected pixel array 50 with preferred radius of two is shown. The pixel of interest 52 is the center pixel, bolded with intensity value of 60. FIG. 6 presents the same data set 60, ordered from low to high. A median value of 37 (part 62) is deduced from this data set and is used to replace the value of the pixel of interest 52 in the FIG. 5 pixel array. FIG. 7 illustrates the revised array 70 with pixel of interest 72 replaced by the median value of 37, from FIG. 6. This process is repeated pixel by pixel until the entire image has been smoothed through the application of the median filter. FIG. 4 is a representation of the original pixel set selected in FIG. 2 after the median filter has been applied to all the pixels of interest 40. The ordinate 42 represents pixel intensity and is labeled Gray Value. The abscissa 44 indicates pixel sequence number from the selected row in FIG. 2.

Figure 8:
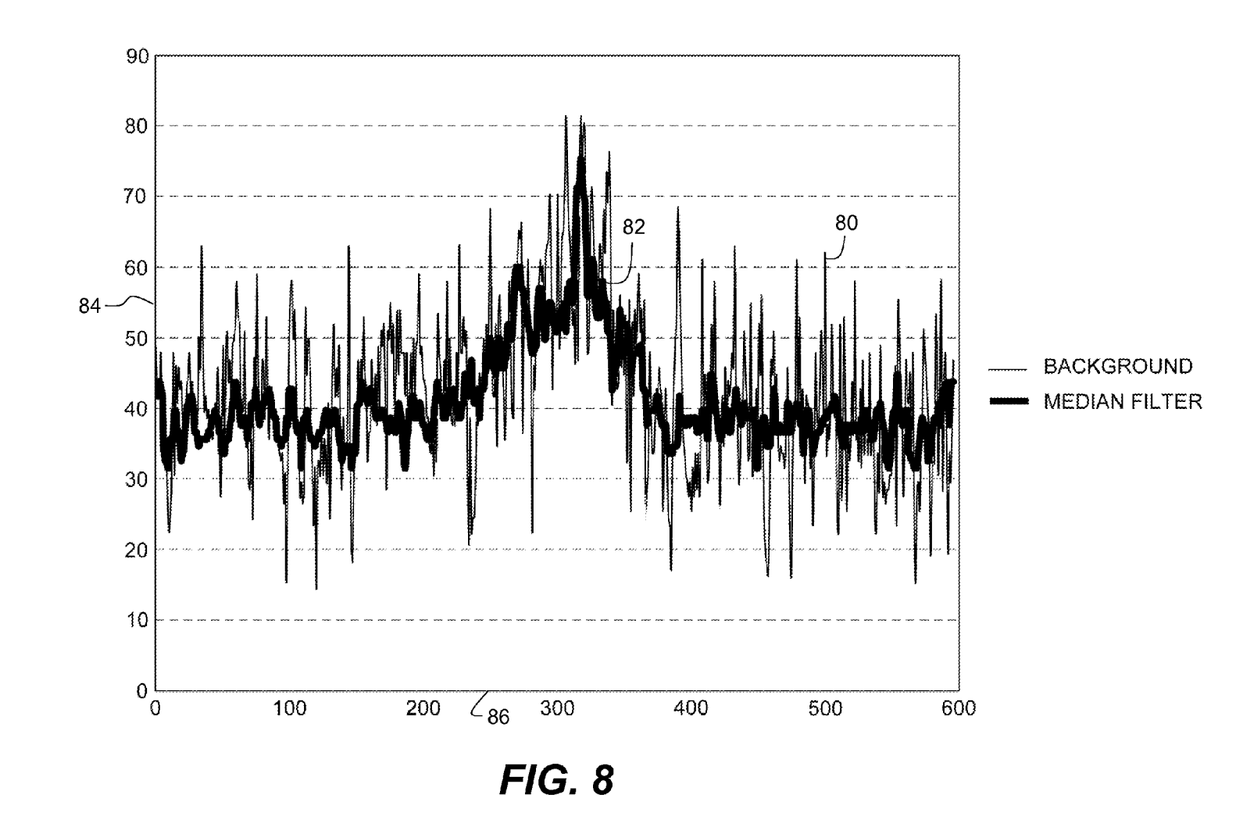
FIG. 8 is an overlay of the data from FIG. 3 and FIG. 4 with intensity displayed by the ordinate and pixel count by the abscissa.

FIG. 8 is a representation of a co-incident overlay of before 80, and after 82 median filter application, variability. The ordinate 84 represents pixel intensity while the abscissa 86 indicates pixel sequence number from the pixel row selected in FIG. 2.

Images acquired with co-incident electromagnetic radiation 98 will result in detection of emission from security markers 94, if present. These marker emission images are processed to reduce noise through an averaging of a plurality of a sequence of images. Background images are collected without co-incident electromagnetic radiation. If sources of extraneous radiation 12 are present, both the security marker and background images will reveal those extraneous emission signals. Elimination of extraneous radiation 12 from the security marker image is accomplished by the subtraction of coordinating pixel intensity values of the smoothed background image from the security marker image. Resulting pixels of sufficient intensity (those above a cutoff threshold) will represent security marker emission signals in the final image.

Another embodiment of the invention discloses a method of eliminating background noise from a system for authenticating security markers. A plurality of images of a background with a security marker is captured and the background images are averaged. The security marker is illuminated and a plurality of images of optical response is captured. The plurality of optical responses is averaged and the averaged background image is smooth. The smooth background image is subtracted from the average of the plurality of optical response images.

The invention has been described in detail with particular reference to certain preferred embodiments thereof, but it will be understood that variations and modifications can be effected within the scope of the invention.

PARTS LIST

- 10 background image pane
- 11 background image noise
- 12 extraneous radiation
- 14 glass rod
- 20 single row of pixels selected for closer examination
- 30 plot of intensity values of single row of pixels identified in part 20
- 32 ordinate indicating intensity of individual pixels
- 34 abscissa indicating pixel order of single row in part 20
- 40 pixel of interest
- 42 ordinate indicating intensity of individual pixels
- 44 abscissa indicating pixel order
- 50 subset of pixels in spatial orientation with pixel of interest located at center
- 52 pixel of interest
- 60 pixels from part 50 ordered left to right from low to high value
- 62 median of pixel array, value of 37
- 70 subset of pixels in spatial orientation with pixel of interest located at center
- 72 pixel of interest whose value has been replaced with median value 37
- 80 plot of intensity values of single row of pixels identified in part 20
- 82 overlay plot of intensity values of single row of pixels after median filter has been applied
- 84 ordinate indicating intensity of individual pixels 86 abscissa indicating pixel order
- 90 reader device
- 91 fail indicator
- 92 pass indicator
- 93 actuator
- 94 marker particle
- 95 varnish overcoat containing marker particles
- 96 label substrate with varnish and marker overcoat
- 97 cutout revealing excitation and detection chamber
- 98 radiation emanating from reading device
- 99 emission from marker particle
- 100 reader image sensor
- 101 object
- 102 USB interconnect cable
- 103 computer

The invention claimed is:

1. A method of eliminating background noise from a system for authenticating security markers comprising:
   capturing an image of a background with a security marker;
   illuminating the security marker;
   capturing a plurality of images of an optical response of the security marker;
   averaging the plurality of optical response images;
   smoothing the background image; and
   subtracting the smoothed background image from the average of the plurality of optical response images.

2. The method of claim 1 comprising:
   calculating a score based on the number of pixels above a predetermined threshold; and
   authenticating the security marker if the score meets predetermined requirements.

3. The method of claim 1 wherein the images are captured by a CCD or CMOS sensor.

4. The method of claim 1 wherein smoothing the background image comprises applying a median filter on a pixel by pixel basis to the background image.

5. The method of claim 1 wherein averaging the plurality of optical response images comprises:
   averaging the corresponding pixels of the plurality of images.

6. A method of eliminating background noise from a system for authenticating security markers comprising:
   capturing a plurality of images of a background with a security marker;
   averaging the background images;
   illuminating the security marker;
   capturing a plurality images of an optical response;
   averaging the plurality of optical response images;
   smoothing the averaged background image; and
   subtracting the smoothed background image from the average of the plurality of optical response images.

7. The method of claim 1 wherein averaging the plurality of optical response images comprises:
   calculating a resulting image wherein each pixel value is an average of the corresponding pixel values of the plurality of images.

* * * * *